Jan. 3, 1956 W. M. WATKINS, JR 2,729,395
THERMOSTATS AND OUTLET CASTINGS USED IN MOUNTING
THERMOSTATS IN AUTOMOTIVE COOLING SYSTEMS
Filed Aug. 30, 1950
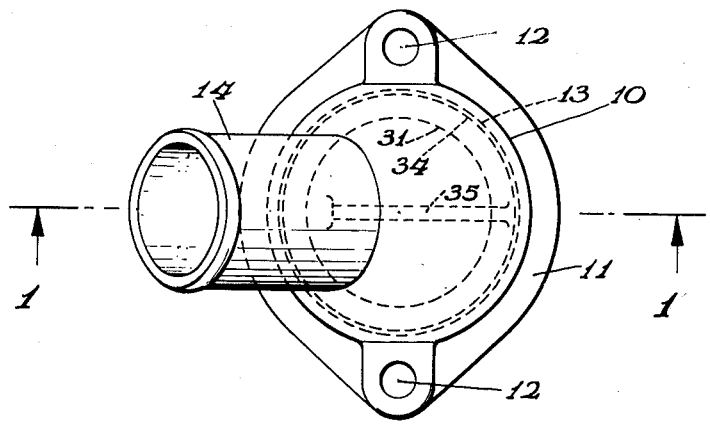
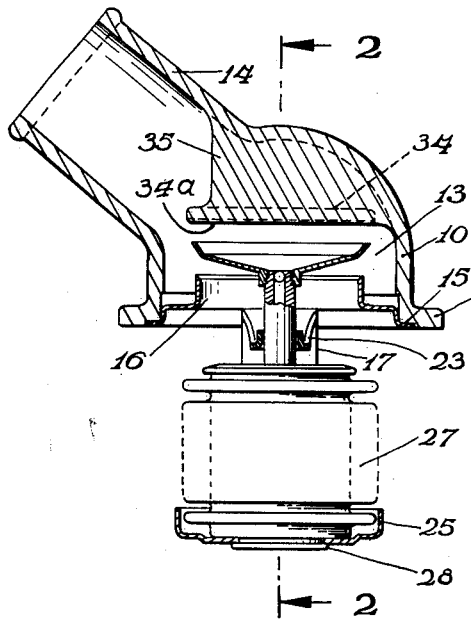
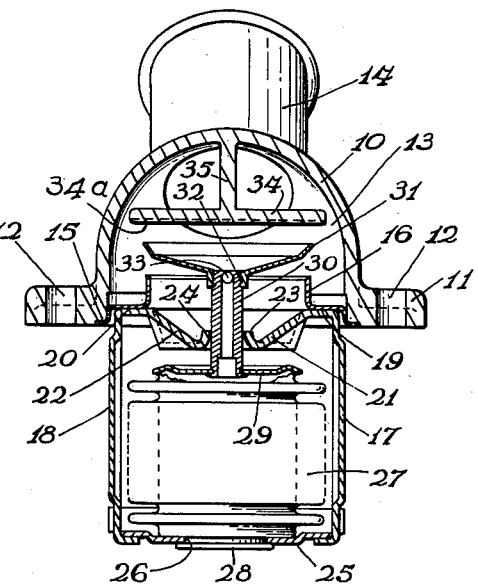
INVENTOR
William M. Watkins, Jr.
BY
ATTORNEY

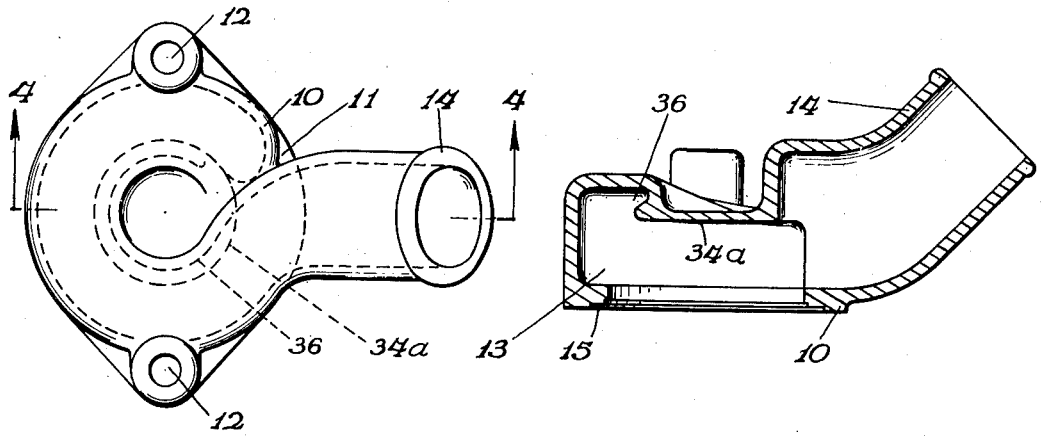
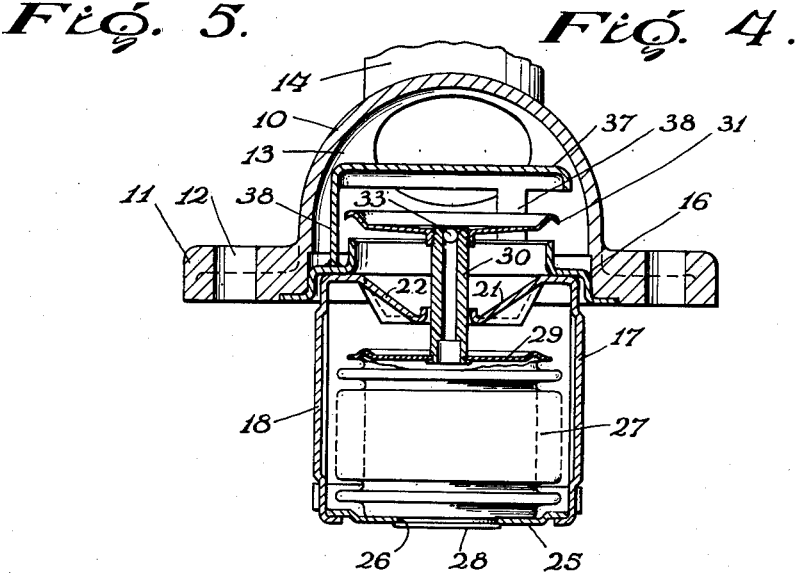
Fig. 5.    Fig. 4.
Fig. 6.
INVENTOR
William M. Watkins, Jr.
BY
Albert J. Henderson
ATTORNEY

United States Patent Office 2,729,395
Patented Jan. 3, 1956

2,729,395

THERMOSTATS AND OUTLET CASTINGS USED IN MOUNTING THERMOSTATS IN AUTOMOTIVE COOLING SYSTEMS

William M. Watkins, Jr., Knoxville, Tenn., assignor to Robertshaw-Fulton Controls Company, Greensburg, Pa., a corporation of Delaware Application August 30, 1950, Serial No. 182,361

8 Claims. (Cl. 236—34)

This invention relates to thermostats and more particularly to automotive thermostats of the poppet valve type and their cooperating outlet castings in which the effect of eddy currents on the downstream side on the valve member are minimized.

Heretofore the poppet valves of bellows type automotive thermostats have been subject to a condition known to those skilled in the art as "blow-down" which results in a loss of flow through the valve upon increase of fluid supply pressure. A definite closing movement of the poppet valve occurs when "blow-down" conditions exist and under the best of circumstances the valve remains in a fixed position even though there is a fluid temperature increase which would otherwise tend to further open the valve.

"Blow-down" is caused by several conditions in the circulating system of the internal combustion engine and usually does not occur until a critical supply pressure is exceeded. Conditions affecting "blow-down" are temperature, position of the valve member with respect to its seat, and flow restriction in outlet casting design.

When the valve member is returned toward its seat or maintained in fixed position by "blow-down," loss of flow at higher pressures results and the temperature differential between opening of the valve and full flow position is increased. "Blow-down" is therefore a most undesirable characteristic in an automotive temperature control valve. Heretofore no way has been known to minimize or eliminate this undesirable condition.

I have found that the eddy currents and buffeting of the valve member of a poppet type thermostatic valve on its downstream side and the resulting "blow-down" can be eliminated if a flat surface is provided in the outlet casting just above and parallel to the downstream side of the valve member. This surface is so positioned with respect to the valve member that the valve member approaches the surface very closely or comes in contact with it in the full stroke or full flow position. This surface is preferably of slightly larger diameter than that of the valve member but may be smaller without losing its beneficial effects. Further, I have found that if such a surface is supported by a thin rib so disposed in the outlet casting as to approximately divide the flow of fluid equally on each side of a center line through the casting outlet pipe that the effect of this surface is enhanced.

With such a surface arranged as described with respect to the poppet it has been found that "blow-down" is virtually eliminated and that the full flow of the thermostat occurs at a much lower temperature reducing, in effect, the temperature differential of the thermostat.

It is accordingly an object of the present invention to provide a novel thermostat of the poppet valve type and outlet casting therefor to eliminate buffeting and eddy currents on the downstream side of the valve of the thermostat to overcome the condition known as "blow-down."

Another object is to provide such a novel thermostat and outlet casting in which a surface is provided parallel to the downstream side of the valve member of the thermostat to be contiguous thereto when the valve is in open position to minimize the effects of currents on the downstream side of the valve member.

Another object is to provide such a novel thermostat and outlet casting in which the surface disposed parallel and adjacent to the downstream side of the valve member is supported by a web dividing the flow of fluid through the outlet of the casting approximately into equal parts to minimize the effect of currents on the downstream side of the valve member.

Another object is to provide such a novel thermostat and outlet casting in which the surface disposed adjacent to and parallel with the downstream side of the valve member is formed integrally with the outlet casting.

Another object is to provide such a novel thermostat in which the surface disposed adjacent to and parallel with the downstream side of the poppet is supported by the framework of the thermostat.

Other and further objects of the present invention will appear from the following description.

My invention is capable of various mechanical embodiments three of which are shown in the accompanying drawings to illustrate the same. These illustrative embodiments of my invention should in no way be construed as defining or limiting the same and reference should be had to the appended claims to determine the scope of my invention.

Referring now to the drawings, in which like reference characters indicate like parts, Fig. 1 is a view, partly in section, of an embodiment of my invention showing the relative positions of the several elements thereof and showing the flat surface disposed adjacent to and parallel with the upper edge of the poppet and supported by a web dividing the outlet passage into approximately equal parts;

Fig. 2 is a view partly in section of the embodiment of Fig. 1 as seen from the right therein showing the arrangement of the surface and supporting web with respect to the outlet of the outlet casting;

Fig. 3 is a view from above of the outlet casting of Fig. 1;

Fig. 4 is a cross-sectional view of another embodiment of my invention in which the surface disposed adjacent to and parallel with the upper edge of the poppet valve member is formed on an element integral with the top of the outlet casting, the valve member and associated structure being omitted for the purposes of clarity;

Fig. 5 is a view from above of the embodiment of Fig. 4; and

Fig. 6 is a cross-sectional elevation of another embodiment of my invention in which the surface disposed adjacent to and above the upper edge of the poppet is supported by the framework of the thermostat.

Referring now more particularly to Figs. 1, 2 and 3, in the embodiment of my invention there shown an outlet casting 10 is provided with a conventional flange 11 including holes 12 to receive bolts to secure the outlet casting 10 in conventional manner in the cooling system of an internal combustion engine. Casting 10 includes a conventional chamber 13 and an outlet connection 14 leading therefrom. Chamber 13 is provided with an annular groove 15 to receive poppet valve seat element 16. Frame elements 17 and 18 are suitably secured at 19 and 20 respectively to seat 16 as by brazing or by other suitable means and have inwardly extending arms 21 and 22 which terminate at 23 and 24 in a guide for the valve stem as will more fully appear hereinafter.

Frame elements 17 and 18 pass through and support a suitable and conventional cup-shaped bottom member 25. Member 25 is circularly cut away at 26. An expansible and contractible corrugated resilient vessel or bellows 27 is mounted within frames 17 and 18 and is secured to cup 25 in conventional manner by expanding its closed end 28 through and around opening 26. Bellows 27 is closed at its upper end by a suitable cap 29 secured thereto by any suitable means and cap 29 carries hollow valve stem 30 which opens into the interior of bellows 27. Stem 30 passes through the guides 23 and 24 provided by arms 21 and 22 and supports poppet valve member 31 at its upper end by any suitable means here shown as by threads 32. Bellows 27 is filled with a suitable thermostatic liquid through the hollow stem 30 and stem 30 is then closed by any suitable means shown at 33. Poppet valve member 31 cooperates with its seat 16 to control the flow of fluids therethrough depending upon the degree of expansion or contraction of bellows 27 as determined by the temperature of the coolant circulating in the cooling system of the engine.

Means is provided for presenting a flat surface adjacent the downstream side of the valve member 31 and is here shown as a circular flange 34 so positioned that the lower surface 34a thereof is parallel to the upper edge of valve member 31 and spaced therefrom so that valve member 31 closely approaches or even contacts the same in its fully open position. Flange 34 is preferably of slightly larger diameter than valve member 31 but may be of the same or somewhat smaller diameter than member 31 without losing its beneficial effects. Flange 34 is supported in place by a web 35 which is secured to the upper inner surface of chamber 13 by any suitable means or may be cast integrally therewith. As shown, flange 34 and web 35 are cast integrally with the outlet casting 10 but it is obvious that they may be formed as separate elements and suitably secured in position within chamber 13 by brazing or the like. Web 35 should be so disposed within chamber 13 that it will divide the flow of fluid in chamber 13 passing outwardly through outlet 14 into approximately equal parts.

Tests conducted with this embodiment of my invention have conclusively proved that flange 34 and web 35 positioned as described effectively shield the valve member and virtually eliminate eddy currents and buffeting of valve member 31 and have virtually eliminated "blow-down" downstream of poppet 31 in chamber 13.

In the embodiment of my invention shown in Figs. 4 and 5 outlet casting 10 is again provided with an annular groove 15 to receive the framework of the bellows and poppet valve assembly which are not shown and outlet chamber 13 provided in casting 10 has a conventional outlet 14. Casting 10 is provided with openings 12 to receive bolts to secure casting 10 in conventional manner in the cooling system of the engine. In this embodiment of my invention the means for presenting a surface adjacent the downstream side of the valve member comprises the roof of chamber 13. Outlet 14 enters chamber 13 spirally and tangentially as at 36 to permit free and unimpeded liquid flow away from the valve member and chamber 13.

The embodiment of my invention described with respect to Figs. 4 and 5 efficiently eliminates "blow-down" on poppet 31 and provides the several advantages of my invention as discussed above. This embodiment is particularly useful where the overall dimensions of the outlet casting must be limited.

In the embodiment of my invention shown in Fig. 6 the bellows and valve assembly is similar to that described with respect to Figs. 1 and 2 and outlet casting 10 is of conventional form. In this embodiment the surface heretofore indicated at 34a and disposed adjacent to and parallel with the upper edge of the valve member 31 is provided by a suitable plate member 37 having downwardly extending supports 38 which are suitably secured, as by brazing or welding, to valve seat member 16 to hold plate 37 in position with respect to valve member 31. This type of construction is particularly suited for use in existing systems where it is not desired to change the outlet casting 10 and provides a unitary structure which may be readily inserted in existing systems. Tests of this embodiment show that plate 37 effectively reduces eddy currents and buffeting of valve member 31 and effectively eliminates "blow-down" while in no way impeding the flow of coolant through the thermostat.

It will now be apparent that by the present invention I have provided a novel thermostat and outlet casting which virtually eliminates "blow-down" on the poppet valve of the thermostat thus reducing the operating temperature range of the thermostat and permitting it to reach its fully opened position at much lower temperatures. My invention therefore satisfies the several objectives described above.

Changes in or modifications of the above described illustrative embodiments of my invention may now be apparent to those skilled in the art without departing from my invention concept and reference should be had to the appended claims to determine the scope of my invention.

It is claimed and desired to secure by Letters Patent:

1. A thermostat comprising a casing having a passage for fluid therethrough, an apertured valve seat in said passage, a poppet valve element movable relative to said seat for controlling fluid flow through said casing and having a downstream side defining a plane, thermally responsive means for actuating said valve element including an expansible element arranged to be contacted by fluid flowing into said casing, said valve element being operable to open and closed position solely by means of said expansible element, means in said passage providing a surface disposed substantially parallel to said downstream side of said valve element and adjacent thereto when said valve element is in open position for shielding the downstream side of said valve element from the effects of turbulent flow, and a single means for connecting said last named means to said casing and dividing said fluid flow into approximately equal parts.

2. A thermostat comprising a casing defining a walled fluid duct having a generally cylindrical side wall, spaced end walls and an inlet opening in one of said end walls and an outlet passage in the other said end wall, an annular valve seat in said duct, a circular poppet valve element positioned downstream of said seat in axial alignment therewith and movable relative to said seat for controlling fluid flow through said duct, said valve member having a downstream side defining a plane, thermally responsive means for actuating said valve element including an expansible element arranged to be contacted by fluid flowing into said casing, said valve element being operable to open and closed position solely by means of said expansible element, a flange carried by one of said walls and providing a surface in said passage substantially parallel to said downstream side of said valve element in all positions thereof and in close proximity thereto when said valve element is in open position, said flange being positioned between said valve element and said other wall, said surface being substantially coextensive with said downstream side of said valve element for shielding said downstream side of said valve element from the effects of turbulent flow downstream thereof and thereby maintaining substantially constant loading on said expansible element.

3. A thermostat comprising a casing having a passage for fluid therethrough, an apertured valve seat in said passage, a poppet valve element movable relative to said seat for controlling fluid flow through said passage and having a downstream side defining a plane, thermally responsive means for actuating said valve element including an expansible element arranged to be contacted by fluid flowing into said casing, said valve element being operable to open and closed position solely by means of said expansible element, a flange carried on said casing and providing a surface in said passage substantially parallel to said downstream side of said valve member and adjacent thereto when said valve element is in open position, said surface being substantially coextensive with said downstream side of said valve element for shielding said downstream side of said valve element from the effects of turbulent flow, and a web connecting said flange to said casing, said web being effective to divide said fluid flow into approximately equal parts.

4. A thermostat comprising a casing having a passage for fluid therethrough, an apertured valve seat in said passage, a poppet valve element movable relative to said seat for controlling fluid flow through said casing and having a downstream side defining a plane, thermally responsive means for actuating said valve element including an expansible element arranged to be contacted by fluid flowing into said casing, said valve element being operable to open and closed position solely by means of said expansible element, said casing having a wall thereof formed to provide a flat surface in said passage parallel to said downstream side of said valve element and contiguous thereto when said valve element is in open position for shielding the downstream side of said valve element from the effects of turbulent flow and thereby maintaining substantially constant loading on said expansible element.

5. A valve structure as claimed in claim 4 wherein said surface is substantially coextensive with said downstream side of said valve element.

6. In a control device, the combination comprising a casing defining a walled fluid duct having a generally cylindrical side wall, spaced end walls, and an inlet opening in one of said end walls and an outlet opening in the other of said end walls, a valve seat member supported intermediate said inlet and outlet openings by said side wall and defining an annular valve seating surface within said fluid duct, a circular valve member axially aligned with said seating surface and movable between open and closed positions relative thereto for controlling the flow of fluid through said fluid duct, said valve member being positioned on the downstream side of said valve seating surface and being biased by the downstream fluid pressure toward engagement with said valve seating surface, the downstream side of said valve member defining a plane substantially parallel with said seating surface, thermally responsive means for actuating said valve member between said positions including an expansible and contractible element positioned upstream of said valve seat member and operatively connected to said valve member, a circular member positioned in axial alignment with said valve member on the downstream side thereof and spaced from said other end wall, means including one of said conduit walls for supporting said circular member, said circular member defining a planar surface on the upstream side thereof substantially parallel with said downstream side of said valve member and positioned in close proximity to said downstream side of said valve member in its said open position, said circular member being operative in said position to substantially shield said valve member from the buffeting action caused by turbulence and eddy currents produced by variations in pressure of the fluid between said valve seat and said other casing wall whereby the downstream surface of said circular member is exposed to said buffeting action and is operative to confine the force of the same to the space between said circular member and said other end wall.

7. A control device as claimed in claim 6 wherein said circular member is supported by said valve seat member.

8. In a control device, the combination comprising a casing defining a walled fluid duct having a generally cylindrical side wall, spaced end walls, and an inlet opening in one of said end walls and an outlet opening in the other of said end walls, a valve seat member supported intermediate of said inlet and outlet openings by said side wall and defining an annular valve seating surface within said fluid duct, a circular valve member axially aligned with said seating surface and movable between open and closed positions relative thereto for controlling the flow of fluid through said fluid duct, said valve member being positioned on the downstream side of said valve seating surface and being biased by the downstream fluid pressure toward engagement with said valve seating surface, the downstream side of said valve member defining a plane substantially parallel with said seating surface, temperature responsive means for actuating said valve member between said positions including an expansible element positioned upstream of said valve member and operatively connected thereto, a planar member positioned parallel to said valve member intermediate said valve member and said other end wall and of smaller diameter than said side wall whereby fluid can flow around the periphery thereof from said valve seat to said outlet when said valve member is in said open position, means for supporting said planar member on said seat member said planar member defining a chamber between the downstream side thereof and said other end wall and positioned whereby the upstream side thereof is in close proximity to and substantially coextensive with said downstream side of said valve member in said open position of said valve member, said planar member being operative to shield said valve member from turbulence and eddy currents caused by variations in pressure of the fluid downstream of said valve member and thereby causing the buffeting force of said turbulence and eddy currents to be expended on the downstream surface of said planar member within said chamber.

References Cited in the file of this patent

UNITED STATES PATENTS

| | | |
|---|---|---|
| 1,129,016 | Ritchie | Feb. 16, 1915 |
| 1,204,898 | Nichols | Nov. 14, 1916 |
| 1,940,999 | Ferlin et al. | Dec. 26, 1933 |
| 2,065,148 | Nallinger | Dec. 22, 1936 |
| 2,469,930 | Payne | May 10, 1949 |